April 16, 1940.  W. F. WRIGHT  2,197,422
WHEEL BALANCING WEIGHT
Filed Oct. 24, 1939
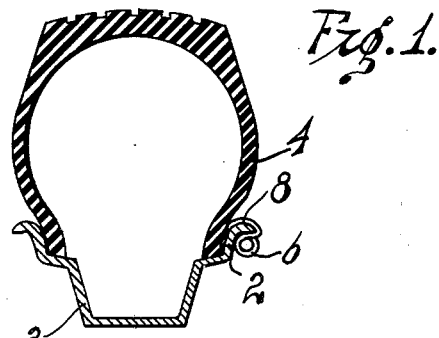
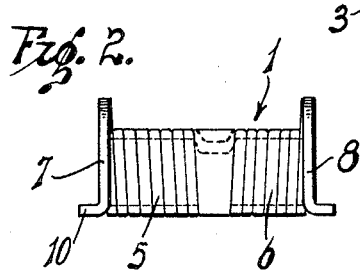 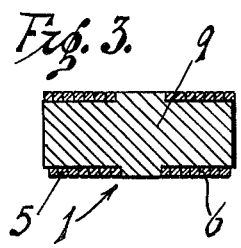 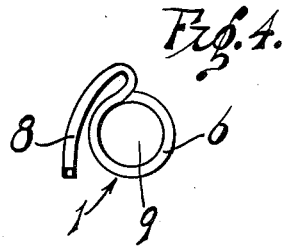
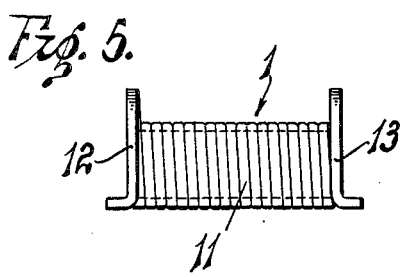 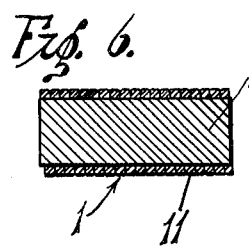 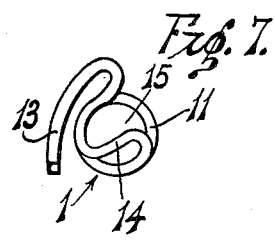
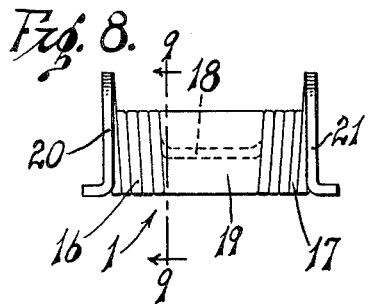 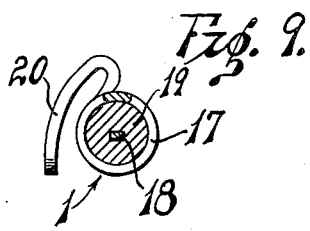
INVENTOR
WILLIAM F. WRIGHT.
BY
ATTORNEY.

Patented Apr. 16, 1940

2,197,422

UNITED STATES PATENT OFFICE 2,197,422

WHEEL BALANCING WEIGHT

William F. Wright, Los Angeles, Calif., assignor to E. R. Radabaugh, San Pedro, Calif.

Application October 24, 1939, Serial No. 300,974

5 Claims. (Cl. 301—5)

This invention relates to a wheel balance weight, whereby the static and dynamic balance of a wheel, such as automobile or truck, may be corrected so that the wheel will rotate without movement or vibration at high speeds.

An object of my invention is to provide a novel wheel balance weight, which, when mounted on the wheel rim, will tenaciously retain its position, and which is easily placed by the workman.

Another object is to provide a novel wheel balance weight, including a coil or coils of wire, which surround a metal weight, the coil or coils of wire including a gripping finger, which engages the bead flange of the wheel rim.

Still another object is to provide a wheel balance weight of the character stated, which is simple in construction and inexpensive to manufacture.

Other objects, advantages and features of invention may appear from the accompanying drawing, the subjoined detailed description, and the appended claims.

In the drawing:

Figure 1 is a transverse, sectional view of a tire and rim, showing my wheel balance weight in operative position.

Figure 2 is a side elevation of one form of my wheel balance weight.

Figure 3 is a longitudinal, sectional view of the same.

Figure 4 is an end view of the same.

Figure 5 is a side elevation of a slightly modified form of my wheel balance weight.

Figure 6 is a longitudinal, sectional view of the same.

Figure 7 is an end view of the same.

Figure 8 is a side elevation of another slightly modified form of my wheel balance weight.

Figure 9 is a sectional view taken on line 9—9 of Figure 8.

Referring more particularly to the drawing, my wheel balance weight 1 is applied to the bead flange 2 of the rim 3. The usual tire casing 4 is mounted on the rim 3 in the usual and well-known manner. As shown in Figures 2 to 4 inclusive, my wheel balance weight includes wire coils 5 and 6 slightly spaced apart at their inner ends, the one coil being wound left-hand, and the other right-hand. The coils 5 and 6 are each formed with an attaching finger 7, and 8, respectively, these fingers being preferably integrally formed with the wire forming the coils 5 and 6. The coils 5 and 6, as well as the fingers 7 and 8, are preferably formed of spring material, so that these fingers will more tenaciously grip the bead flange. A weight bar 9, which is preferably lead, is poured, threaded or pressed into the coils 5, 6, and is retained within these coils, as shown. The coils 5 and 6 are slightly spaced apart at the center, so that one coil can be wound left-hand, and the other right-hand. This spacing of the coils also permits the weight bar 9 to flow outwardly, as shown in Figure 3, thus providing a lock or key to prevent this weight from falling out of the coils. The outer ends of the fingers 7 and 8 may be bent outwardly, as shown at 10, so that the balance weight can be more readily inserted between the bead flange and the casing. This outwardly bent foot also gives additional gripping surface so that the wheel balance weight is more effectively held in position.

In operation, the workman presses the attaching fingers 7 and 8 over the bead flange, and between the casing, and this flange, substantially as shown in Figure 1. The coil or coils enclosing the weight is on the outside and rests closely against the bead flange, so that the weight is relatively inconspicuous. The coils 5 and 6, being of spring material, as well as the attaching fingers 7 and 8, will tightly grip the bead flange.

In Figures 5 to 7 inclusive, I have disclosed a modified form of wheel balance weight, including one continuous coil 11, also preferably formed of spring material, and on each end of the coil, attaching fingers 12 and 13 are bent. On the one end, a reverse curve 14 is bent in order that both of the fingers 12 and 13 may extend from the inner edge of the coil, thus forming an effective grip on the bead flange between the coil and the fingers. A weight bar 15 is poured, pressed or threaded into the coil 11, and is fixedly held within this coil. The coil and fingers are preferably integrally formed, and are made of a suitable spring wire.

In Figures 8 and 9, I have disclosed a third modification, consisting of spaced coils 16 and 17, which are connected by a bar 18, formed of the same material as the coils. The weight bar 19 is poured around the bar 18, thus effectively holding this weight bar in position. An attaching finger 20 and 21 is integrally formed with the coils 16, 17, respectively, and engage the bead flange in the same manner as previously described. The coils and the fingers herein described may be formed of a material, which is either round or flat in cross-section, as desired.

Having described my invention, I claim:

1. A wheel balance weight comprising a coil, a pair of spaced attaching fingers on said coil, and a weight bar within said coil and retained thereby.

2. A wheel balance weight comprising a spring coil, a finger at each end of said coil and integrally formed therewith, and a weight bar within said coil and retained thereby.

3. A wheel balance weight comprising a pair of spaced coils, an attaching finger integrally formed with each of the coils, and a weight bar within said coils and retained thereby.

4. A wheel balance weight comprising a pair of spaced coils, an attaching finger integrally formed with each of the coils, a bar connecting the inner ends of said coils, and a weight surrounding said bar.

5. A wheel balance weight comprising an elongated wire coil, an attaching finger at the outer ends of said coil, said attaching finger being integrally formed with the coil, and a weight bar within the coil and retained thereby.

WILLIAM F. WRIGHT.